US008429705B2

(12) United States Patent
Delegue et al.

(10) Patent No.: US 8,429,705 B2
(45) Date of Patent: Apr. 23, 2013

(54) SYSTEM AND METHOD FOR TRANSMITTING INTERACTIVE SERVICES ASSOCIATED WITH BROADCAST CONTENTS, IN REAL TIME OR OFF LINE

(75) Inventors: Gérard Delegue, Cachan (FR); Erwan Baynaud, Paris (FR)

(73) Assignee: Alcatel Lucent, Paris (FR)

( * ) Notice: Subject to any disclaimer, the term of this patent is extended or adjusted under 35 U.S.C. 154(b) by 1095 days.

(21) Appl. No.: 11/855,367

(22) Filed: Sep. 14, 2007

(65) Prior Publication Data

US 2008/0072270 A1 Mar. 20, 2008

(30) Foreign Application Priority Data

Sep. 15, 2006 (FR) ..................................... 06 53775

(51) Int. Cl.
*H04N 7/173* (2006.01)

(52) U.S. Cl.
USPC .......................................................... 725/110

(58) Field of Classification Search .................. 348/734; 725/110
See application file for complete search history.

(56) References Cited

U.S. PATENT DOCUMENTS 7,552,193 B2 * 6/2009 Carro ............................ 709/217
7,950,031 B2 * 5/2011 Weinblatt et al. ............... 725/23
2002/0059575 A1 * 5/2002 Watts et al. ........................ 725/1
2002/0082905 A1 * 6/2002 Matsuda et al. ................ 705/10
2003/0073432 A1 * 4/2003 Meade, II ..................... 455/420
2004/0003097 A1 * 1/2004 Willis et al. ................... 709/228
2005/0251823 A1 * 11/2005 Saarikivi ......................... 725/42
2006/0235754 A1 * 10/2006 Walker et al. ................... 705/15
2007/0161402 A1 * 7/2007 Ng et al. .................... 455/554.2

FOREIGN PATENT DOCUMENTS

WO WO 99/04568 A1 1/1999
WO WO 99/67904 A1 12/1999

* cited by examiner

*Primary Examiner* — Hunter Lonsberry
*Assistant Examiner* — Christine Kurien
(74) *Attorney, Agent, or Firm* — Fay Sharpe LLP

(57) ABSTRACT

A system is dedicated to the transmission of additional contents (CA) accessible in interactive mode and associated with contents (CP) broadcast to primary communication terminals (TP1, TP2), connected to a broadcasting network (R1) and associated with programming information (PI). This system comprises i) an equipment (ST) required to associate a data set (ES) with each additional content (CA), including a content definition, an address to access it and a broadcast date, depending on programming information (PI), and to transmit each set (ES) through the broadcasting network before the broadcast date contained in it, ii) primary communication terminals (TP1, TP2) required to store each transmitted set (ES) and to enable loading of the definition and the address contained in it during a time interval including the broadcast date contained in it, and iii) secondary communication terminals (TS11-TS23) each being capable of loading each definition and the associated address, stored by a neighboring primary communication terminal (TP1, TP2), during the associated time interval so as to immediately display and/or broadcast it and thus enable its user to select it to request transmission of the additional content associated with it to the associated address through a communication network (R2).

20 Claims, 1 Drawing Sheet

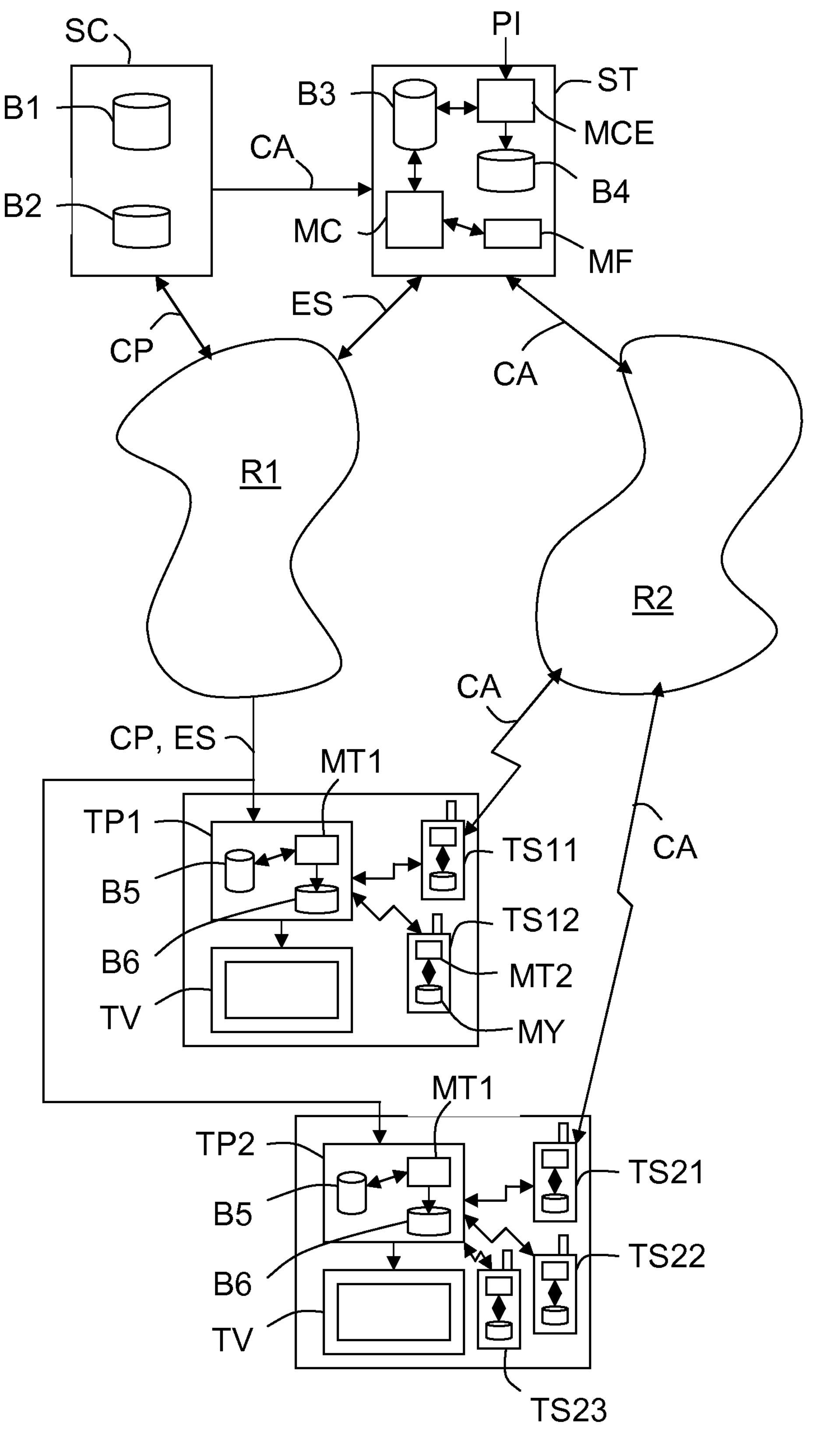
SC
B1
B2
CA
PI
ST
B3
MCE
B4
MC
MF
ES
CP
CA
R1
R2
CA
CP, ES
MT1
TP1
TS11
B5
TS12
B6
MT2
TV
MY
MT1
TP2
TS21
B5
TS22
B6
TV
TS23
CA

SYSTEM AND METHOD FOR TRANSMITTING INTERACTIVE SERVICES ASSOCIATED WITH BROADCAST CONTENTS, IN REAL TIME OR OFF LINE

BACKGROUND OF THE INVENTION

The invention relates to the transmission of additional contents accessible in interactive mode and associated with contents broadcast to communication terminals.

"Content" in this description means voluminous data sets defining a television or video or audio program (voice or musical) or games or multimedia or a computer (or "data") file.

In this description, "communication terminal" means any type of communication equipment capable of receiving at least contents from a broadcasting network (fixed or mobile, and possibly satellite or hybrid). For example it could be television program reception equipment for example such as a "Set-top box" or a television set, video or musical program reception equipment, a fixed or portable computer, equipment onboard a vehicle (car, truck, bus, train and similar) or even a fixed or mobile (or cellular) telephone, or a personal digital assistant (or PDA).

In order to complete the contents that it broadcasts to customers and/or to interact with them, some content broadcasters or operators associate interactive services specific to these contents. For example, services may non-exhaustively include the provision of additional information, propose downloading of ringtones or musical or cinematographic works, sales of products and articles of all types, and display of a slow playback. This is done by having broadcasters include interactivity data in their content data, that offer interactive services at predefined instants, possibly in the form of menus. Thus, a customer who is looking at (or listening to) a content received using his terminal through the broadcasting network to which he is coupled, can see a special purpose message displayed at a given moment on the screen of his terminal, usually related to said content.

However, it is (very) difficult to use such interactive services when the content broadcast by a terminal is being viewed or listened to by several persons at the same time, as is frequently the case for family television sets or television sets located in public or private locations. Interactivity usually has a personal aspect that depends on the tastes and needs of each person. Furthermore, there are several disadvantages with broadcasting of messages at the same time as a content; it can be less comfortable for persons, it only provides interactive services to customers at predefined instants rather than when they actually need them or want them, and it only provides interactive services that are supposed to correspond to an average customer profile rather than customised services.

Consequently, although the provision of interactive services in addition to broadcast contents according to the above mentioned mode may be suitable for terminals without shared use, for example such as mobile (or cellular) telephones, personal digital assistants or portable computers, it is not suitable for terminals with shared use, for example such as television sets. Unfortunately, screens on terminals for which use is not shared are small or very small, which makes it difficult not only to read interactive messages, but also to read additional selected information within the context of interaction with the broadcaster or the operator.

It is proposed that customers who have shared use terminals can improve their access to interactivity, by using their personal mobile telephones using SMS ("Short Message System") type messages, to reply to broadcast interactive messages. This avoids a customer disturbing other customers with which he is sharing a terminal, and it also means that several customers who share the same terminal can interact practically simultaneously with the broadcaster. But this solution is not integrated, and firstly obliges every customer to input a text message and a communication address, which is not always easy considering the small size of the keys on mobile terminals, and secondly it means that customers cannot transmit anything on their mobile terminals other than additional text type information and in very small quantities, because it is done using short messages. Furthermore, this solution does not solve the problem of customisation of interactive services, nor the problem of access to interactive services when customers want it.

There is no known solution that is fully satisfactory, therefore the purpose of the invention is to improve the situation.

SUMMARY OF THE INVENTION

To achieve this, it proposes a system designed to transmit additional contents accessible in interactive mode and associated with contents broadcast to customers on primary communication terminals, attached to a broadcasting network and associated with programming information.

This transmission system is characterised in that it comprises:

- equipment required to associate a data set with each additional content including a content definition, an address used to access the content and a broadcast date, depending on programming information, and to transmit each set through the broadcasting network before the broadcast date contained in it,
- primary communication terminals required to store each transmitted set and used to load the definition and address contained in it during a time interval including the broadcast date contained in it, and
- secondary communication terminals, designed to load each definition and the associated address stored by the neighbouring primary communication terminal, during the associated time interval, so as to display and/or broadcast this definition immediately thus allowing its user to select it to request transmission of the additional content associated with it to the associated address through a two-directional communication network to which it has subscribed.

The transmission system according to the invention may comprise other characteristics that may be taken in isolation or in combination, and particularly:

- its secondary communication terminals may for example store at least some of the loaded definitions and associated addresses to enable their user to select one of them after they have been displayed and/or broadcast so as to request transmission of the additional content associated with it to the associated address through the two-directional communication network;
- each primary communication terminal may be required to transmit definitions to be loaded and the associated addresses to the secondary neighbouring communication terminals. For example, this transmission may be done by radio waves;
- as a variant, each secondary communication terminal may be required to retrieve definitions to be loaded and the associated addresses from the neighbouring primary communication terminal. For example, this retrieval may be done by radio waves;

the equipment may be required to associate a set of data with each additional content, including a content definition composed of a category representative of this additional content and/or a phrase describing this additional content and/or at least one word related to this additional content;

each secondary communication terminal may be required to analyse each loaded definition so as to display it and/or broadcast it only if it satisfies a profile related to its user;

for example, each secondary communication terminal may store at least one profile defined by its user;

as a variant or in addition, each secondary communication terminal may for example store at least one profile related to its user and defined by the operator of the communication network to which its user has subscribed;

each primary communication terminal may be required to delete a set that it stored when its loading time interval has expired;

each primary communication terminal may include a clock synchronised with a broadcasting network clock used to broadcast contents in accordance with programming information;

each primary communication terminal may be required to display and/or broadcast a definition associated with this content, to be loaded at the same time as the received content;

the equipment may be required to store additional contents. In this case, part of the address associated with a definition of the content refers to the communication address of the equipment;

when it receives a request to obtain an additional content associated with a content definition selected by the user of a secondary communication terminal, the equipment may be required to transmit the additional required content to this secondary communication terminal through the communication network to which it is connected;

the equipment may be required to count each additional content transmitted to a secondary communication terminal, for billing purposes.

BRIEF DESCRIPTION OF THE DRAWINGS

Other characteristics and advantages of the invention will become clear after reading the description given below and the appended drawing, on which the single FIGURE very diagrammatically illustrates an example embodiment of a content transmission system according to the invention, coupled to a broadcasting network and a mobile network. The appended drawing may be used firstly to complete the invention, but also to contribute to its definition, if necessary.

DETAILED DESCRIPTION OF THE INVENTION

The purpose of the invention is to enable persons who are looking at and/or listening to a content broadcast through a broadcasting network and associated with additional contents accessible in interactive mode, to access these contents using the same (primary) communication terminal, without reducing the comfort of other persons and if possible when they really need or want them (in other words not necessarily during the broadcast) and/or if possible in a customised manner.

Note that the invention can also be used by a customer (user) to access an additional interactive content off-line (in other words after it is broadcast) when he saved the definitions of the associated content and address.

The following description is given with reference to a non-limitative example in which the broadcasting network is a fixed communication network such as a network comprising medium or high speed data transmission lines, for example such as XSDL ("x Digital Subscriber Line") type lines or cables or optical fibres (for example of the FTTH ("Fiber To The Home") type). But the invention is not limited to this type of broadcasting network. It applies to any type of fixed or mobile communication network capable of broadcasting contents to communication terminals. Therefore it could also be a land broadcasting network (particularly DVB-T or DVB-H) or a satellite or a hybrid (in other words a land (for example DVB-H) and satellite network).

Furthermore, the following description is made with reference to a non-limitative example in which the contents broadcast by the broadcasting network are television programs. But the invention is not limited to this type of content. It concerns any type of content that might be broadcast, and particularly video or audio programs (voice or musical) or games or multimedia or computer files (or "data").

Furthermore, the following the description is made with reference to a non-limitative example in which primary communication terminals that are connected to the broadcasting network (in this case of the fixed type), consist of "Set-top box" type television program reception equipment. But the invention is not limited to this type of communication terminal. It concerns any type of equipment that can be connected to a broadcasting network, and particularly equipment for reception of video or music programs or games, fixed or portable computers, television or encrypted video program decoders, onboard equipment on a vehicle (car, truck, bus, train, and similar), or even mobile telephones (or cellular phones) or personal digital assistants (PDAs).

As shown diagrammatically and functionally in the single FIGURE, the invention proposes a content transmission system comprising at least one processing equipment ST coupled to at least one broadcasting network R1 and at least one two-directional communication network R2, primary communication terminals TPi connected to the broadcasting network R1, and secondary communication terminals TSij connected to the two-directional communication network R2.

The system according to the invention may possibly and also include content server(s) SC that is (are) required to broadcast contents CP through the broadcasting network R1, to primary communication terminals TPi, and to provide additional contents CA associated with these contents CP and that can be accessed in interactive mode. For example, the content server SC comprises a first memory (or database) B1 storing data forming the contents CP to be broadcast, and a second memory (or database) B2 storing data forming the additional contents CA associated with the contents CP.

In particular, the additional contents CA include interactive services (hypertext links, videos, music, ringtones, animations, detailed descriptions of objects to be sold, lists (and summaries) of films, videos or music work to be downloaded, press articles, scientific articles, references of articles or books, Internet site addresses, addresses of hotels or cultural locations, all types of information, for example), that content broadcasters (or any other interested person, for example such as the operator of the two-directional communication network R2 or an advertiser) have associated with their television programs to complement the information contained in them and/or enable customers to make purchases or give their opinion about a program.

It will be noted that the content server SC and the processing equipment ST may possibly be in the same location, or even form part of the same equipment.

In the following, we will consider a preferred but non-limitative example in which the two-directional communication network R2 is a mobile (or cellular) network, for example such as a UMTS (3G) network. But the invention is not limited to this type of two-directional communication network. It concerns any type of communication network that can exchange data (in other words transmit and receive it) with communication terminals adapted to this purpose. Therefore, it could be a fixed, satellite or hybrid communication network.

Considering the preferred choice mentioned above of the network type R2, the secondary communication terminals TSij are of the mobile (or cellular) type, for example such as mobile (or cellular) telephones, personal digital assistants (PDAs), or portable computers, or portable video players and/or MP3 type players equipped with an appropriate communication interface. For example, in the following it is considered that the secondary communication terminals TSij are mobile telephones.

In the following description given as a non-limitative example, we will only consider Set-top box TPi type reception equipment installed in living rooms with a connection to the broadcasting network R1, and that are coupled to a TV device to display images of received contents and to broadcast sounds possibly associated with these images, for example such as a monitor or television set. Note that instead of being installed in living rooms, the reception equipment TPi may for example be installed in waiting rooms, restaurants, meeting rooms or conference rooms, or in any other public or private place.

Furthermore, at least one of the persons looking at a content (in this case a television program) broadcast by a TV device has a mobile telephone TSij that can be connected to the mobile network R2.

In this description, the index i is used to reference a reception equipment TPi installed in a room. For example, in the example illustrated, the values are equal to 1 and 2. The index j refers to a mobile telephone TSij used by a person (or customer) installed in a room containing reception equipment TPi and that is therefore close to this reception equipment. In the example illustrated, the values are equal to 1 to 3.

The processing equipment ST is preferably a server. Its first function is to associate a data set ES with each additional content CA originating from the content server SC (through a direct connection as illustrated or through the broadcasting network R1), the data set including a content definition, an address (or link) used to access said additional content CA, and a broadcast date that defines the instant at which said additional content CA is to be provided to customers looking at the associated content CP, as a function of the programming information PI.

For example, the processing equipment ST comprises a first memory (or database) B3 in which it stores data forming the received additional content CA, and a second memory (or database) B4 in which it stores data forming the sets ES that it created. Furthermore, for example it comprises a module MCE required to create the sets ES from the data CA stored in the first memory B3 and programming information PI. Such a module MCE may for example be in the form of special purpose software, possibly “intelligent” software such as software that uses new scene description technologies such as MPEG-7.

For example, the programming information Pi forms the broadcast Electronic Programme Guide EPG. In particular, it contains a precise timetable for broadcasting television programs CP and texts summarising these programs.

A content definition (or “tag”) is intended to give a summary description of an interactive service defined by an additional content CA. For example, it is composed of a category that represents an additional content CA (for example composed of “Information”, “Purchase”, “Video”, “Music”, “Photos”, or “Games”) and/or a phrase describing this additional content CA and/or a list of at least one word related to this additional content CA.

When the additional contents CA are stored by the processing equipment ST (for example in its first memory B3), a part of each address (or link) associated with a content definition refers to the communication address of this processing equipment ST.

The processing equipment ST is also required to transmit each set ES that it created before the broadcast date contained in it has expired, to reception equipment TPi through the broadcasting network R1. For example, it transmits them on the day before the programs CP with which they are associated are broadcast.

According to the invention, each reception equipment TPi is firstly required to store each set ES transmitted by the broadcasting network R1, for example in a first memory (or database) B5 contained in it. Another function is to enable loading of the definition and the address contained in each set ES stored during a time interval including the broadcast date contained in it, by neighbouring mobile telephones TSij (in other words close to it, for example in the same room). For example, it does this using a processing module MT1 that is required to analyse broadcast dates contained in the stored sets ES, in the memory B5, so as to assign a loading time interval including the corresponding broadcast date to each of them.

For example, each reception equipment TPi comprises a second memory B6 in which its processing module MT temporarily (in other words during the time interval associated with it), stores each definition and the associated address ready to be downloaded by neighbouring mobile telephones TSij.

Loading can be done in two different ways.

The first is at the initiative of each reception equipment TPi. In this case, each reception equipment TPi is required to automatically transmit all definitions and associated addresses to neighbouring mobile telephones TSij and stores them temporarily in its second memory B6. For example, this transmission can be done by broadcasting through radio waves using a Bluetooth or WiFi type interface (quite suitable for transmission over short distances).

The second manner is at the initiative of each mobile telephone TSij. In this case, each mobile telephone TSij is required to retrieve definitions and associated addresses from the neighbouring reception equipment TPi, and temporarily stores them in its second memory B6. As in the first manner, retrieval may for example be done by radio, by exchange of request and response message, using a Bluetooth or WiFi type interface.

As soon as the loading time interval of a content definition has expired, the processing module MT1 of a reception equipment TPi deletes this definition from its first memory B5 and its second memory B6. To achieve this, the first memory B5 and the second memory B6 may for example be in the form of buffer memories.

In one variant, it would be possible for the processing module MT1 of a reception equipment TPi to store content definitions and associated addresses with associated time intervals, in the first memory B5. In this case, the content definitions and associated addresses may be loaded directly from the first memory B5 during their corresponding loading time intervals, and then deleted once their loading time intervals have elapsed. The second memory B6 can then be used to store all content definitions and associated addresses once they have been deleted from the first memory B5, so that a user can view them off line.

Furthermore, each reception equipment TPi may comprise a clock that is synchronised with the clock that the broadcasting network R1 uses to precisely broadcast the contents CP in accordance with the programming information PI. For example, this clock synchronisation may be done by periodic transmission of synchronisation information from the broadcasting network R1 (or the processing equipment MT) to the reception equipment TPi. This means that the additional contents CA can be provided to customers at precise instants defined by the processing equipment MT.

Note that each reception equipment TPi may possibly also transmit each content definition to the TV display device to which it is connected, and temporarily stores this definition in its second memory B6 (or its first memory B5 depending on the chosen embodiment), at the same time as the content CP with which it is associated, so that they can be displayed and/or broadcast simultaneously.

Apart from its function to load "active" content definitions (in other words for which the time interval includes the current instant), each mobile telephone TSij is also required to immediately display and/or broadcast at least some loaded content definitions to enable its user to select one of them to request transmission of the additional content CA associated with it to the associated address (in this case from the processing equipment MT).

Note that each loaded content definition is not necessarily and systematically displayed and/or broadcast through a mobile telephone TSij. It would be possible to envisage that each mobile telephone TSij is provided with a processing module MT2 to analyse each loaded content definition so as to only authorise its display and/or broadcasting if it satisfies a profile corresponding to its user. This is intended to enable customisation of interactive services depending on the users.

For example, the processing module MT2 classifies each loaded content definition as a function of the category that it contains, and then it applies a filter that depends on the user profile.

For example, each mobile telephone TSij may store at least one profile that was defined manually by its user using the keyboard by means of menus that can offer choice lists. For example, as a variant or in addition, each mobile telephone TSij may store at least one profile related to its user and defined by the operator of the mobile network R2 to which he is a subscriber. In this case, the profile may be adapted by the operator over time, depending on his understanding of the user's needs and wishes, reflected by additional contents (or interactive services) CA that he uses most frequently.

Preferably, each mobile telephone TSij comprises a memory MY in which its processing module MT2 stores at least some of the loaded content definitions and the associated addresses (in other words all loaded addresses, or only those that were selected during filtering). This function is particularly useful because it means that each user can select a content definition, and therefore request the associated additional content CA, after it has been displayed and/or broadcast on/by his mobile telephone TSij after it has been loaded (and possibly filtered) and therefore when he wants it. To achieve this, the mobile telephone TSij may include menus that the user can use to view content definitions stored in the memory MY so as to possibly select one of them when he wishes.

When a content definition has been selected (directly or off line), the mobile telephone TSij transmits a request to the equipment (in this case ST), referred to by the associated address (or link), to obtain the associated additional content CA. This transmission takes place through the mobile network R2.

When this request is received, the equipment (in this case ST) transmits it to a control module MC included in it. This control module then accesses the (first) memory B3 in which the additional contents CA are stored, so as to extract data that define the additional content CA referred in the received request. The equipment (in this case ST) then transmits these extracted data to the mobile telephone TSij that required them, through the mobile network R2, so that it displays them on its screen and/or broadcasts them on its speaker, under the control of its user. The user can then use them as he wishes. For example, he can thus carry out actions such as a purchase or access to an Internet site, based on data in the received additional content CA, using his mobile telephone TSij.

Note that the equipment (in this case MT) that is required to receive requests related to additional contents CA, may for example comprise a billing module (or "accounting" module) MF coupled to its control module MC and that is required to count each additional content CA transmitted to a mobile telephone TSij, for billing purposes depending on his subscription type.

The different modules described above, and particularly processing modules MT1 and MT2, the control module MC, the set creation module MCE and the billing module MF, are preferably implemented in the form of software (or computer) modules. But they may also be in the form of electronic circuits or a combination of circuits and software.

The invention is not limited to the embodiments of a transmission system described above as examples only, but it comprises all variants that those skilled in the art might consider within the framework of the claims described below.

The invention claimed is:

1. A method for transmitting additional contents accessible in interactive mode and associated with contents broadcast to primary communication terminals connected to a broadcasting network, the method comprising:

associating a data set with each additional content including a content definition, an address used to access the content and a broadcast date;

transmitting each data set through the broadcasting network before the broadcast date contained in the data set to the primary communication terminals;

loading each definition and the address associated with it during a loading time interval that includes the broadcast date associated with this definition and this address in a stored set, into at least one secondary communication terminal located in a neighbourhood of a primary communication terminal using a Bluetooth or WiFi interface;

displaying and/or broadcasting the loaded definition using the secondary communication terminal; and requesting transmission of an additional content associated with a displayed or broadcast definition selected by the user to the address associated with this selected definition using the secondary communication terminal through a two-directional mobile or cellular communication network.

2. A primary communication terminal, capable of being connected to a broadcasting network so as to receive broadcast contents, associated with additional contents, accessible in interactive mode and associated with information, the primary communication terminal being operative to:

i) store sets of data defined by an equipment as a function of the information and each set of data including an additional content definition, an associated address to access the additional content and a broadcast date, and broadcast by the broadcasting network before the broadcast dates contained in the data sets, and ii) transmit an additional content definition and the associated address that are contained in a stored set to at least one neighbouring secondary communication terminal using a Bluetooth or WiFi interface during a loading time interval including the broadcast date contained in the set.

3. A primary communication terminal according to claim 2, the primary communication terminal being operative to automatically transmit the additional content definition and the associated address to the at least one neighbouring secondary communication terminal, during the loading time interval that includes the broadcast date associated with the additional content definition and the associated address in a received set.

4. A primary communication terminal according to claim 2, the primary communication terminal being operative to delete a set that it stored when the loading time interval that includes the broadcast date contained in this set has expired.

5. An equipment capable of being connected to a broadcasting network required to broadcast contents associated with additional contents, accessible in interactive mode and associated with information, the equipment being operative to:

i) associate a set of data with each additional content, including a content definition, an address used to access it and a broadcast date, as a function of the information, and ii) transmit each data set through the broadcasting network before the broadcast date that the data set contains, to primary communication terminals designed to store each set of data and enable loading of the content definition and the address contained in the data set using a Bluetooth or WiFi interface during a loading time interval including the broadcast date contained in the data set, by at least one neighbouring secondary communication terminal.

6. An equipment according to claim 5, the equipment being operative to associate a set of data with each additional content, including a content definition composed of a category representative of the additional content and/or at least one word related to the additional content.

7. An equipment according to claim 5, the equipment being operative to store the additional contents wherein a part of the address associated with a content definition refers to its own communication address.

8. An equipment according to claim 5, the equipment being connected to a two-directional mobile or cellular communication network, the equipment being operative when it receives a request to obtain an additional content associated with a content definition selected by the user of a secondary communication terminal connected to the two-directional mobile or cellular communication network and transmitted through the two-directional mobile or cellular communication network, the equipment being operative to transmit the additional content to the secondary communication terminal through the two-directional mobile or cellular communication network.

9. An equipment according to claim 8, the equipment being operative to count each additional content transmitted to a secondary communication terminal for billing purposes.

10. A system for transmitting additional contents accessible in interactive mode and associated with contents broadcast to primary communication terminals connected to a broadcasting network, comprising:

an equipment;

primary communication terminals; and secondary communication terminals operative:

i) to load additional content definitions and addresses used to access these additional contents during chosen loading time intervals, stored by a neighbouring primary communication terminal, ii) to display and/or broadcast at least some of the loaded definitions so that a user of the secondary communication terminal can select them, and iii) to request transmission of the additional content associated with a selected definition to the address associated with this selected definition, through a two-directional mobile or cellular communication network;

the equipment being connected to the primary communication terminals through the broadcasting network so as to transmit sets of data to them;

each data set being associated with an additional content and each including a content definition, an address to access the additional content and a broadcast date, the equipment transmitting each data set being before the broadcast date in the data set, such that the primary communication terminals enable loading of a definition and an address contained in a data set received during a loading time interval including the broadcast date contained in the data set using a Bluetooth or WiFi interface; and the secondary communication terminals being operative to display and/or broadcast a loaded definition from a neighbouring primary communication terminal to enable users of the secondary communication terminals to select the loaded definition to request transmission of the additional content associated with it to the address associated with the definition through the two-directional mobile or cellular communication network.

11. A method according to claim 1, wherein each data set is transmitted through the broadcasting network on the day before the broadcast date contained in the data set to the primary communication terminals.

12. A primary communication terminal according to claim 2, wherein the stored sets of data are broadcast by the broadcasting network on the day before the broadcast date contained in the data set to the primary communication terminals.

13. An equipment according to claim 5, wherein the equipment is operative to transmit each data set through the broadcasting network on the day before the broadcast date that the data set contains.

14. A system according to claim 10, wherein the equipment transmits each data set on the day before the broadcast date in the data set.

15. A method according to claim 1, wherein each data set is transmitted from at least one content server that is required to broadcast the contents through the broadcasting network, and wherein the broadcasting network is a two directional mobile or cellular communication network.

16. A primary communication terminal according to claim 2, wherein the stored sets of data are broadcast from at least one content server that is required to broadcast the contents through the broadcasting network, and wherein the broadcasting network is a two directional mobile or cellular communication network.

17. An equipment according to claim 5, wherein the broadcasting network is a two directional mobile or cellular communication network.

18. A system according to claim 10, wherein the equipment is operative to transmit each data set to the primary communication terminals through a two directional mobile or cellular communication network.

19. A method according to claim 1, wherein the two-directional mobile or cellular network is a UMTS 3G network.

20. An equipment according to claim 5, wherein the two-directional mobile or cellular network is a UMTS 3G network.

* * * * *